Patented Feb. 18, 1930

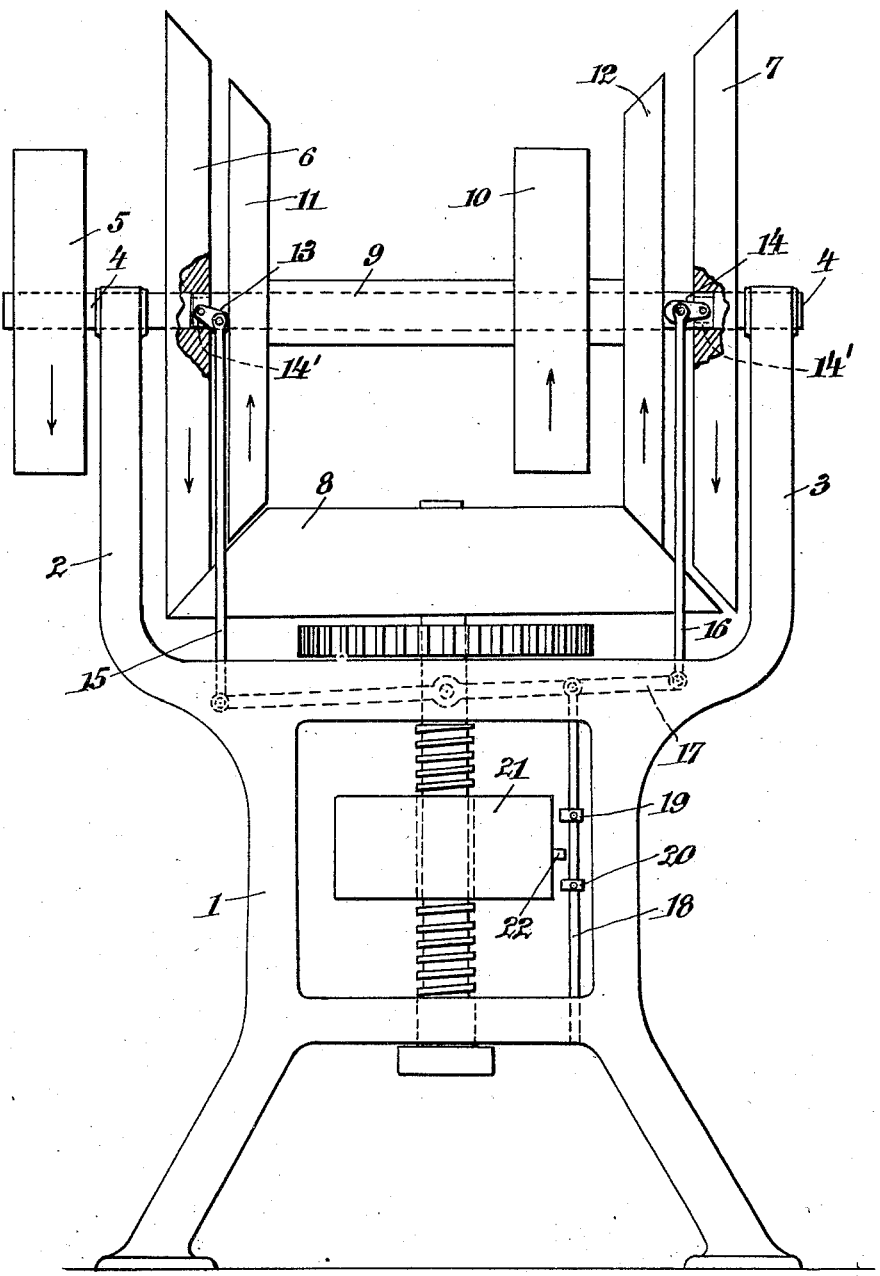

1,747,808

UNITED STATES PATENT OFFICE

LADISLAUS WITKOWSKI, OF VIENNA, AUSTRIA

FRICTION PRESS

Application filed January 14, 1928, Serial No. 246,895, and in Austria January 21, 1927.

This invention relates to improvements in friction presses provided with conical friction wheels and has for its object to prevent one-sided bearing-thrusts to arise in the bearing of the press-screw in case of great stress and which work with a particularly favourable efficiency.

The essential feature of the present invention consists in that on a longitudinally adjustable driven shaft, carrying a pair of driving friction wheels, is mounted a longitudinally adjustable hollow shaft, which is rotated in the opposite direction of rotation and carries a second pair of driving friction wheels, whereby both pairs of driving friction wheels, namely alternately the left hand wheel of the one pair and the right hand wheel of the other pair or vice versa, operate the same friction wheel driving the press-screw.

The accompanying drawing illustrates by way of example one mode of carrying out the present invention.

A shaft 4 is mounted longitudinally adjustable in suitable head stocks 2 and 3 of the frame 1. The shaft is rotated in the direction of the arrow by means of the belt-pulley 5. Conical friction wheels 6 and 7 are mounted on the shaft and are pressed alternately against a friction disc 8, mounted on the screw of the press, by means of a device hereinafter described. Further a hollow shaft 9 is mounted rotatable and longitudinally adjustable on the shaft 4, the said hollow shaft being rotated in the opposite direction of rotation of the shaft 4 by means of a belt-pulley 10, mounted on the shaft 9. Two conical friction wheels 11 and 12 are fixed to the hollow shaft 9 and can be alternately pressed against the friction disc 8 according to the adjustment of the hollow shaft. The friction wheels 6 and 12 or 7 and 11 are simultaneously forced onto the friction disc 8 by forcing apart the wheels 6 and 11 or 7 and 12 respectively, this being accomplished by eccentric members 13 and 14, which are disposed between the said wheels pivotally mounted on bands 14' in turn loosely mounted on the shaft 4. The members 13 and 14 are operated by rods 15 and 16, arranged between the said wheels. For instance if the eccentric member 14 is moved upward, its pivotal end cooperates with the shaft at the boss of the wheel 7, while its free eccentric end cooperates with the boss of the wheel 12. Thereby the shaft 4 is moved to the right hand side to such an extent until the wheel 6 is pressed against the disc 8, and at the same time the hollow shaft 9 is moved to the left hand side until the wheel 12 is pressed with sufficient force against the opposite side of the disc 8. The screw cannot be subjected to an onesided bearing-thrust, because the oppositely acting pressures are alike. Also a considerable force is produced at a comparatively small pressure in consequence of the double moment of friction.

The rods 15 and 16 can be operated manually or, as shown in the drawing, in known manner automatically by the operation of the press. For this object the rods 15 and 16 are pivotally attached to a double armed lever 17, to which is hinged a rod 18, provided with two adjustable stops 19 and 20. The nut 21 of the press-screw is furnished with an extension 22, which is located between the stops 19 and 20 and, according to its cooperation with the one stop or the other stop, turns the lever 17 in the one or the other direction and thus moves into the operative position alternately the member 13, which forces the friction wheels 7 and 11 into engagement with the disc 8, or the member 14, which moves the friction wheels 6 and 12 into engagement with the disc 8, whereby the reversing operation is carried out.

I claim:—

1. Friction press comprising, in combination a frame, a screw mounted in the latter, a friction disc carried by the said screw, a driving shaft mounted longitudinally adjustable in the said frame at a substantially right angle to the screw, a pair of driving friction wheels secured to the said shaft for co-acting with opposite sides of the disc, a hollow shaft mounted longitudinally adjustable on the driving shaft, a pair of driving friction wheels fixed to the opposite ends of said hollow shaft for coacting with opposite sides of the disc and means for alternately and simultaneously moving one of each pair of wheels into engagement with the disc substantially as described and for the purpose specified.

2. Friction press comprising in combination a frame, a vertical screw mounted in the latter, a friction disc carried by the upper end of said screw, a driving shaft mounted longitudinally adjustable in the said frame above the disc, a pair of driving friction wheels secured to the said shaft and positioned on opposite sides of the disc, a hollow shaft mounted longitudinally adjustable on the driving shaft between the wheels, a pair of driving friction wheels also fixed to the ends of the said hollow shaft and arranged adjacent the first mentioned wheels, and adjusting members each of which is located between a friction wheel secured to the driving shaft and a friction wheel fixed to the hollow shaft whereby when one of said members is operated one wheel of each pair is moved into engagement with the opposite sides of the friction disc.

3. Friction press as claimed in claim 2, further comprising rods disposed between the friction wheels and operably connected to the adjusting members, and a double armed operating lever for pivotally supporting the said rods.

In testimony whereof I affix my signature.

LADISLAUS WITKOWSKI.